(12) United States Patent  
Corley

(10) Patent No.: US 9,922,274 B2
(45) Date of Patent: Mar. 20, 2018

(54) PRINTER COLOUR REFERENCE SYSTEM

(71) Applicant: Ferrand D. E. Corley, Mississauga (CA)

(72) Inventor: Ferrand D. E. Corley, Mississauga (CA)

(*) Notice: Subject to any disclaimer, the term of this patent is extended or adjusted under 35 U.S.C. 154(b) by 0 days.

(21) Appl. No.: 15/330,199

(22) Filed: Aug. 23, 2016

(65) Prior Publication Data

US 2017/0061260 A1 Mar. 2, 2017

Related U.S. Application Data

(60) Provisional application No. 62/283,408, filed on Aug. 31, 2015.

(51) Int. Cl.
- H04N 1/60 (2006.01)
- G06K 1/00 (2006.01)
- G06F 15/00 (2006.01)
- G06K 15/02 (2006.01)
- H04N 1/407 (2006.01)
- G01J 3/52 (2006.01)

(52) U.S. Cl.
CPC ............ *G06K 15/027* (2013.01); *G01J 3/522* (2013.01); *H04N 1/4078* (2013.01); *H04N 1/6027* (2013.01); *H04N 1/6033* (2013.01); *H04N 1/6075* (2013.01); *H04N 1/6088* (2013.01)

(58) Field of Classification Search
CPC ..... G06K 15/027; G01J 3/522; H04N 1/4078; H04N 1/6027; H04N 1/6033; H04N 1/6075; H04N 1/6088
USPC .............. 358/1.9, 1.15; 348/189; 399/15, 27
See application file for complete search history.

(56) References Cited

U.S. PATENT DOCUMENTS

| | | | | |
|---|---|---|---|---|
| 4,991,007 A | * | 2/1991 | Corley | H04N 17/002 348/188 |
| 2002/0054769 A1 | * | 5/2002 | Nakamura | H04N 1/6033 399/15 |

* cited by examiner

*Primary Examiner* — Quang N Vo

(57) ABSTRACT

A test apparatus comprising a portable reference element having color and spectrophotometrically neutral gray elements of predetermined hues and saturations, and a digital software file provides identical color and spectrophotometrically neutral grayscale data which, when printed or otherwise reproduced accurately, may be compared with the test colors and grayscale provided by the portable reference element, enabling appropriate adjustments to be made to the printer as required.

4 Claims, 3 Drawing Sheets

PRINTER COLOUR REFERENCE SYSTEM

This application is based on U.S. Provisional application No. 62/283,408, filed Aug. 31 2015, the priority of which is claimed.

FIELD OF THE INVENTION

The invention relates to an apparatus for evaluating and adjusting colour and grayscale reproduction accuracy of colour printing systems, and to a method for quantifying differences in colour and gray tone elements within such reproductions, and facilitating adjustment of colour reproduction in printers.

BACKGROUND OF THE INVENTION

Images are invariably viewed in one of three ways; as a front illuminated print, such as a book, magazine or photograph, a rear illuminated device such as a television set or computer monitor, or as a film or digitally projected image such as a slide presentation or motion picture. The present invention relates to printed or reflected media as in the first example.

Accuracy and control of colour reproduction is important in many fields and vital in medical diagnosis, law enforcement and security. It is also highly desirable that anyone with minimal technical skills and normal colour vision be able to evaluate the accuracy of image reproduction in colour printing equipment and to be able to correct errors in colour image reproduction.

Light sources are typically designated as falling into one of three or four Kelvin categories, depending on the colour temperature of the light—illuminant A for Tungsten, 5400K for direct sunlight, and 6500 K for skylight. While image matching using traditional full spectrum illumination sources such as tungsten and daylight from the sun have been problematic, the issue has been seriously exacerbated with the introduction of discontinuous light sources such as fluorescent and LED illuminants.

Such discontinuous illuminants can produce images wherein certain colours, failing to receive light (visible electromagnetic radiation) at the correct wavelength, will reproduce said colours inaccurately.

The discontinuous illuminant issue can be further complicated by the spectral reflectivity of the pigments, dyes and media used in the image reproduction process.

The present invention is designed to identify and enable quantification and adjustment of such issues, by adjustment of printing equipment settings.

Typical image evaluation systems designed to address accuracy of colour reproduction in colour printers do so electronically by sensing the brightness, hue and saturation of a test image.

Such systems rely on the accuracy and consistency of the sensors and associated electronic equipment, which can require frequent re-calibration from an expert technician and evaluating the data from such systems requires experience to interpret the results.

This invention is designed to overcome these limitations by providing apparatus and software using well-established principles and technology in a system that is intuitive and easy to use by anyone having normal colour vision.

BRIEF SUMMARY OF THE INVENTION

The apparatus comprises one or more precision reference test patterns having a multiplicity of colour and grayscale elements, and matching digital software files of the test patterns.

In one embodiment the pattern is rectangular with gray tones, skin and highly saturated colours, and a rainbow of colours linearly positioned in ever increasing wavelength across the visible spectrum, typically 400 to 700 nm, or, in a circular embodiment, with gray tones and all colours radiating from a central point; this feature enables the reference image elements to be used with any sized print from the accompanying digital file where the printed pattern is larger than the reference image element.

Preferably the segments will include four typical flesh tones and six highly saturated primary and secondary colours.

A hole within the reference image element can simplify positioning of the reference element over the printed image.

The second component of the system namely the digital file, is typically a JPG, PNG, or other image formal file supplied on a USB flash drive, or other storage media.

This digital file is then uploaded into a printer driver, typically a computer connected to the printer.

The digital software file is then reproduced on the printer.

In use the images produced from the digital file are then compared visually for colour and tonal range with the reference image elements. Side by side visual comparison using the human eye is believed by many colour scientists to be the most efficient and accurate method of evaluating and matching colours.

Any discrepancies between the print from the digital file and the reference image element can then be corrected by making adjustments to the printer controls to correct the discrepancies in the colours reproduced by the printer.

Unlike traditional test patterns and image control systems that intermix colours and gray patches, the present invention provides a full spectrum of colours, in both the reference element and in the print produced by the printer from the digital software file, seen side-by-side, in precise, ever increasing wavelength increments, increasing uniformly from 400 to 700 nm, either as individual steps, or continuously through the visible spectrum.

Comparing images printed from the digital files side-by-side against the precision reference element immediately identifies failure of the printing system to reproduce colours in clearly defined areas of the spectrum.

Observed differences between the printed digital files and reference images are noted and corrections are made to printing equipment settings (contrast, hue, saturation, brightness, etc) that will produce a subsequent print having reduced colour and tonal errors. This is an iterative process that is repeated until the printing equipment produces a colour and tonal match to an operator's desired level of precision.

This same process can then be repeated with different types and brands of printing media, i.e. matte, glossy, photo-type paper, linen finish, etc. depending on the requirements and preferences of the operator.

For a better understanding of the invention, its operating advantages and specific objectives attained by its use, reference should be made to the accompanying drawings and descriptive matter in which there are illustrated and described preferred embodiments of the invention.

IN THE DRAWINGS

DESCRIPTION OF A PREFERRED EMBODIMENT

Figure 1:
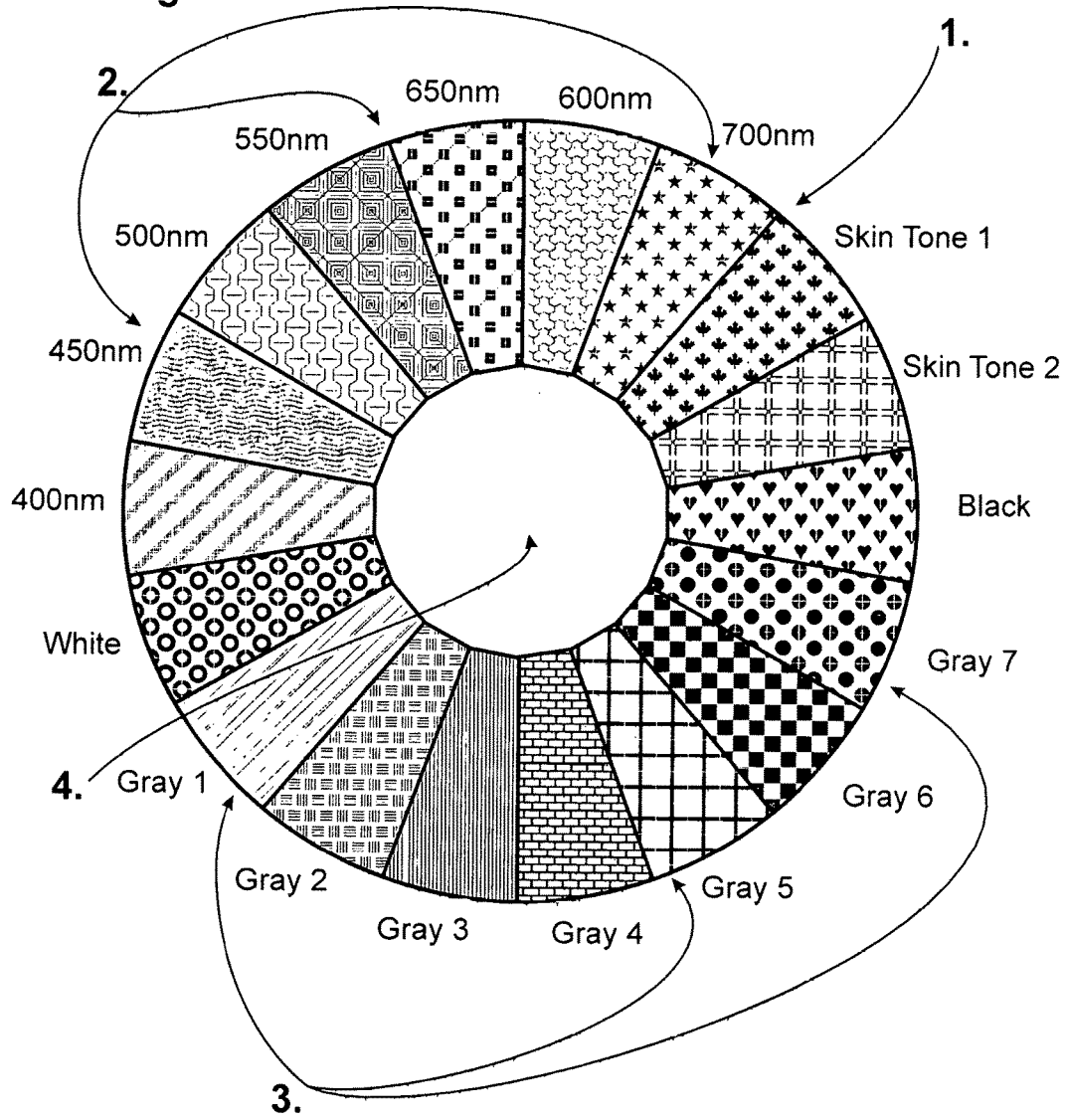
FIG. 1 Is a Front elevation view of one embodiment of the primary reference image element.
Figure 2:
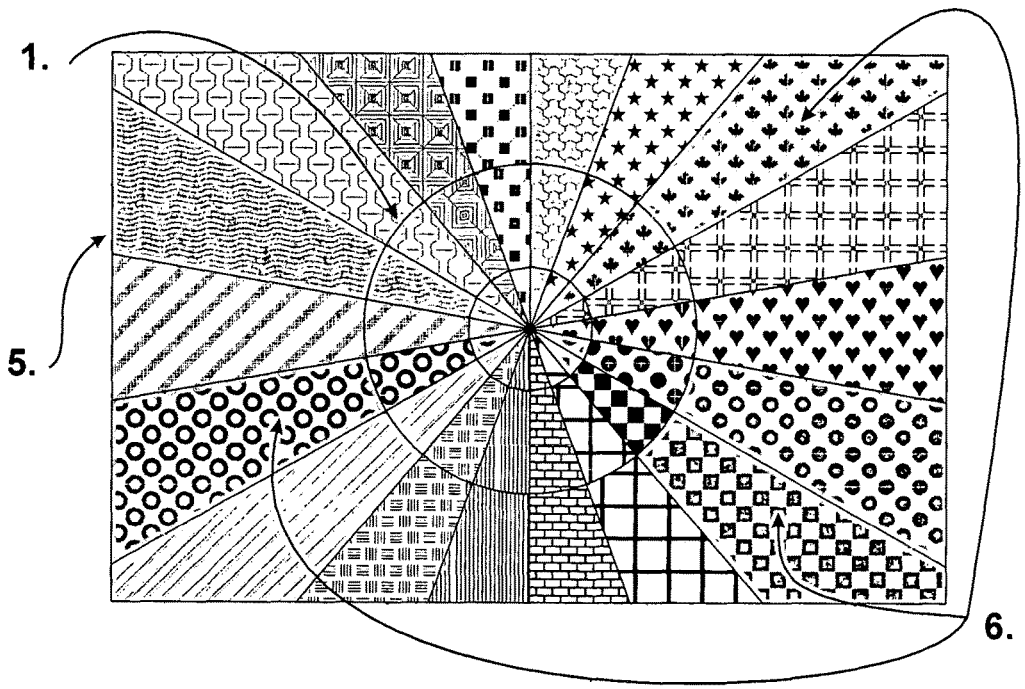
FIG. 2 is a Front elevation of the primary reference image element superimposed over an image printed from the secondary digital file, showing errors.
Figure 3:
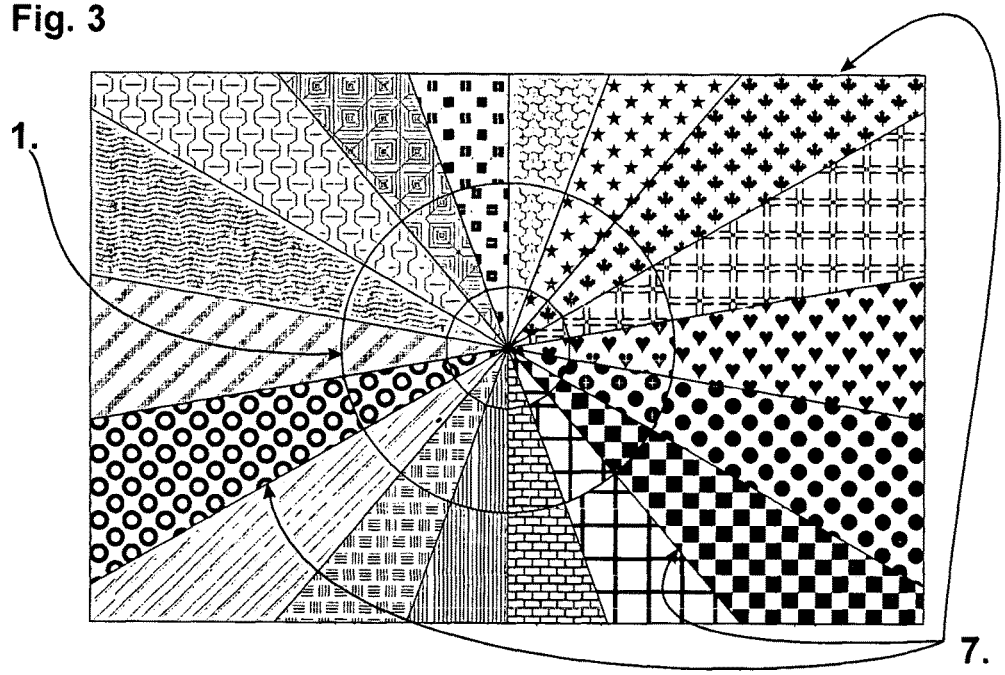
FIG. 3 is a Front elevation of the primary reference image element superimposed over an image printed from the secondary digital file, after correcting the printer to match with the primary reference image element; and, FIG. 4 is a schematic illustration of a printer connected to computer, to which the digital file is uploaded.

Referring to FIGS. 1-3

FIG. 1. Shows the primary reference element 1. typically a round disk, which comprises a panel showing a multiplicity of colour segments 2. encompassing the human visible spectrum, from approximately 400 to 700 nm, and a number of spectrophotometrically neutral gray tone segments 3. ranging from black to white. In a preferred embodiment, the centre of the primary reference element is open at 4. to facilitate centring. It will be understood that there could be a much larger number of smaller segments.

Figure 4:
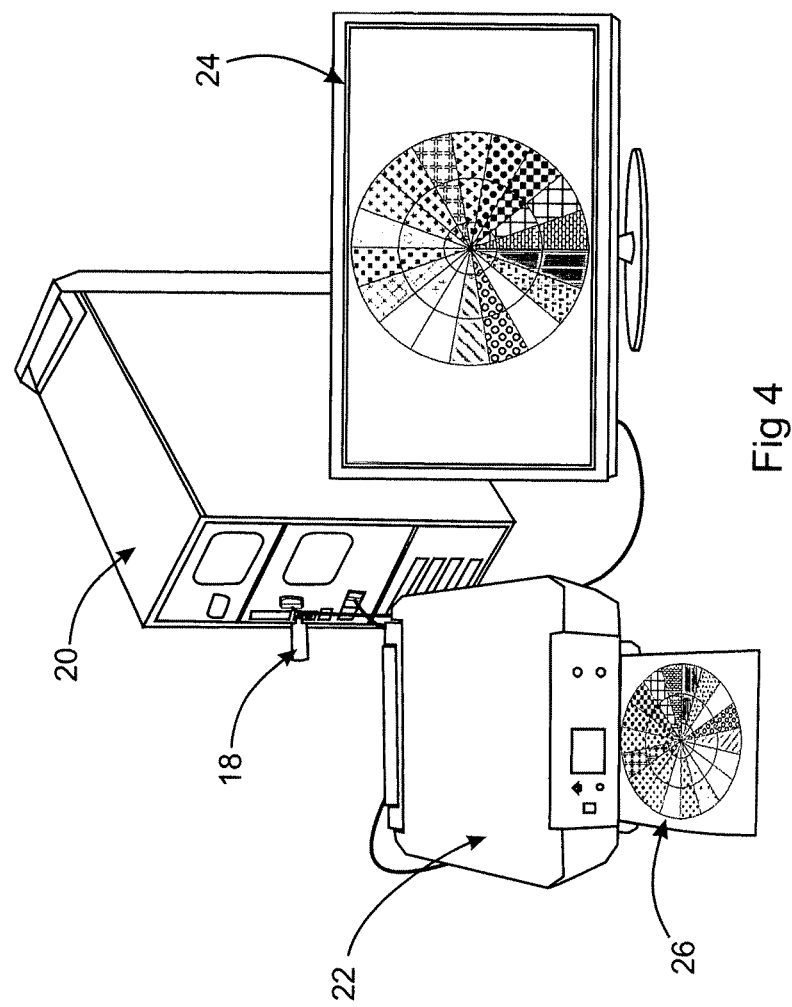

Preferably the segments are shaped as isosceles triangles, as shown, in this embodiment The secondary reference element comprises a digital software file, (not shown), which may be saved on any suitable storage media, such as a USB flash drive, etc 18 (FIG. 4).

The digital software file comprises a digital reference image element with colour and gray scale segments identical to the primary reference image element 1

This digital software file is uploaded into for example a computer 20, connected to a printer 22 (FIG. 4).

A monitor 24 shows the image from the digital software file.

In operation, an operator prints an image from printer 22 of the digital reference pattern, onto any suitable medium such as a clean paper sheet 26, for example. The operator then compares the accuracy of the segments of the printed image with the segments of the primary reference element 1. The printer is then adjusted to compensate for differences 6. in brightness, contrast, gamma, chroma precision and other aspects of image reproduction as are well known in the trade. Different printer manufacturers offer more or less adjustment which is often performed with a sliding scale. The rainbow arrangement of the colours on the reference pattern makes it easy to determine the printer colour to be adjusted. If red is looking too orange, cyan should be increased or yellow decreased. If red is looking too magenta, yellow should be increased or magenta decreased, and so on.

FIG. 3. Illustrates a printer that reproducing colour accurately. There should be no discernible difference between an accurately printed image 7, from the printer, and the primary reference image element 1

The foregoing is a description of a preferred embodiment of the invention which is given here by way of example only. The invention is not to be taken as limited to any of the specific features as described, but comprehends all such variations thereof as come within the appended claims.

What is claimed is:

1. A method of optimising the colour reproduction of a colour printer of the type having colour controls, and being connected to a computer, and comprising the steps of:
   providing a physical primary reference image panel showing a primary reference image having a plurality of colour segments each said colour segment containing a colour different from the adjacent segments, and said colours of said segments varying progressively from blue to red and a plurality of gray tone segments, said segments arranged in a radial pattern and defining a centre, and said primary reference image panel having an opening at said centre,
   uploading a secondary image digital file of software comprising a secondary image into said computer said secondary image having a plurality of colour segments each said colour segment containing a colour different from the adjacent segments, and said colours of said segments varying progressively from blue to red and a plurality of gray tone segments arranged in a radial pattern identical to said pattern of said primary reference image,
   printing said secondary image on a print media from said printer using said secondary image digital file;
   comparing said secondary printed image with said primary reference image to identify any discrepancies between the colour segments and gray tone segments of said primary reference image, and said secondary printed image; and,
   adjusting said colour controls of said printer to eliminate said discrepancies in subsequent prints from said printer.

2. The method of optimising the colour reproduction of a colour printer of the type having colour controls as claimed in claim 1 wherein the primary reference panel has an opening centred in the centre of the primary reference image and including the step of placing the secondary printed image behind and aligned with the primary reference panel with the printed image centred in said reference opening in the panel, and comparing the primary reference image with the printed image.

3. The method of optimising the colour reproduction of a colour printer of the type having colour controls, as claimed in claim 2 and including the step of aligning the colour segments, and gray tone segments of the primary reference image, with the corresponding segments on the secondary printed image.

4. The method of optimising the colour reproduction of a colour printer the type having colour controls, as claimed in claim 2, and including the step of arranging said colour segments in said primary reference image in the sequence from colours starting at blue, and ending at red, and wherein said colour segments have predetermined spectrophotometric values between 400 and 700 nanometers, and said gray segments being spectrophotometrically neutral.

* * * * *